United States Patent
Ahn et al.

(10) Patent No.: US 11,541,792 B2
(45) Date of Patent: Jan. 3, 2023

(54) ARMREST ASSEMBLY MOUNTED ON CONSOLE OF VEHICLE

(71) Applicants: HYUNDAI MOTOR COMPANY, Seoul (KR); KIA MOTORS CORPORATION, Seoul (KR); ECOPLASTIC CORPORATION, Gyeongju-si (KR)

(72) Inventors: Gye-Young Ahn, Seoul (KR); Woo-Hyun Lim, Suwon-si (KR); Sang-Ki Lee, Ansan-si (KR); Hae-Ju Park, Ulsan (KR); Sung-Gu Yeo, Suwon-si (KR)

(73) Assignees: HYUNDAI MOTOR COMPANY, Seoul (KR); KIA MOTORS CORPORATION, Seoul (KR); ECOPLASTIC CORPORATION, Gyeongju-si (KR)

( * ) Notice: Subject to any disclaimer, the term of this patent is extended or adjusted under 35 U.S.C. 154(b) by 233 days.

(21) Appl. No.: 17/036,832

(22) Filed: Sep. 29, 2020

(65) Prior Publication Data
US 2021/0291710 A1    Sep. 23, 2021

(30) Foreign Application Priority Data
Mar. 19, 2020   (KR) .................. 10-2020-0033855

(51) Int. Cl.
*B60N 2/75* (2018.01)
*E05B 83/32* (2014.01)
*B60R 7/06* (2006.01)

(52) U.S. Cl.
CPC .............. *B60N 2/793* (2018.02); *B60R 7/06* (2013.01); *E05B 83/32* (2013.01)

(58) Field of Classification Search
CPC .. B60N 2/793; B60R 7/06; B60R 7/04; E05B 83/32; E05B 1/0038; E05C 3/162; E05C 9/08

(Continued)

(56) References Cited

U.S. PATENT DOCUMENTS

| | | | |
|---|---|---|---|
| 5,116,099 A | * | 5/1992 | Kwasnik .................. B60N 2/75 297/411.32 |
| 5,803,537 A | * | 9/1998 | Langmeser ............ B60N 2/753 292/230 |

(Continued)

FOREIGN PATENT DOCUMENTS

KR    2017-0112430 A    10/2017

*Primary Examiner* — D Glenn Dayoan
*Assistant Examiner* — E Turner Hicks
(74) *Attorney, Agent, or Firm* — McDonnell Boehnen Hulbert & Berghoff LLP

(57) ABSTRACT

An armrest assembly mounted on a console of a vehicle may include a console main body provided with a storage box in which a space is formed and installed between a driver seat and a passenger seat of a vehicle, an armrest pivotably installed in the storage box and configured to support an arm of a passenger in the vehicle and open and close an upper portion of the storage box, a button member installed in the console main body and configured to be operated by the passenger to unlock the armrest, an operating unit configured to lock or unlock the armrest from the console main body according to whether the button member is operated, and a console cover configured to cover a portion in which the button member and the operating unit are installed in the console main body and expose an upper end of the button member.

17 Claims, 9 Drawing Sheets

(58) Field of Classification Search
USPC .................. 296/37.8, 24.34, 37.1, 1.09, 153
See application file for complete search history.

(56) References Cited

U.S. PATENT DOCUMENTS

| | | | | |
|---|---|---|---|---|
| 9,863,171 B1* | 1/2018 | Salter | ...................... | E05B 81/64 |
| 10,352,071 B2* | 7/2019 | Muntean | ................ | E05B 85/06 |
| 10,428,564 B1* | 10/2019 | Ewel | ....................... | B60R 7/043 |
| 10,533,351 B2* | 1/2020 | Yano | ......................... | B60R 7/04 |
| 10,611,310 B2 | 4/2020 | Jones | ...................... | E05B 83/32 |
| 10,669,752 B2* | 6/2020 | Wu | ............................ | B60R 7/00 |
| 11,077,778 B2* | 8/2021 | Miller | ...................... | B60R 7/04 |
| 11,162,286 B2* | 11/2021 | Tewes | ...................... | B60R 7/04 |
| 2003/0057709 A1* | 3/2003 | Hupfer | ................... | E05B 83/30 |
| | | | | 292/5 |
| 2006/0005589 A1* | 1/2006 | Hanjono | ................... | B60R 7/06 |
| | | | | 70/208 |
| 2007/0186598 A1* | 8/2007 | Najima | ..................... | E05C 1/10 |
| | | | | 70/208 |
| 2008/0100068 A1* | 5/2008 | Kim | ......................... | B60N 3/10 |
| | | | | 292/163 |
| 2008/0136193 A1* | 6/2008 | Oh | ............................ | B60R 7/06 |
| | | | | 292/164 |
| 2009/0188288 A1* | 7/2009 | Soma | .................... | E05B 13/005 |
| | | | | 70/398 |
| 2010/0328858 A1* | 12/2010 | Xiong | ................ | H01M 50/209 |
| | | | | 361/679.01 |
| 2015/0035308 A1* | 2/2015 | Huebner | ................... | B60R 7/04 |
| | | | | 296/37.8 |
| 2016/0339848 A1* | 11/2016 | Hodgson | ................... | B60R 7/06 |
| 2016/0340942 A1* | 11/2016 | Anderson | ............... | E05B 83/28 |
| 2018/0274273 A1* | 9/2018 | Anderson | ............... | E05C 3/162 |
| 2018/0371808 A1* | 12/2018 | Yano | ...................... | E05B 83/32 |
| 2019/0186179 A1* | 6/2019 | Wu | ........................ | B60N 2/793 |

\* cited by examiner

ARMREST ASSEMBLY MOUNTED ON CONSOLE OF VEHICLE

CROSS REFERENCE TO RELATED APPLICATIONS

This application claims priority to Korean Patent Application No. 10-2020-0033855, filed on Mar. 19, 2020, which is incorporated herein by reference in its entirety.

BACKGROUND

Field of Present Disclosure

Exemplary embodiments of the present disclosure relate to an armrest assembly mounted on a console in an interior of a vehicle to support a passenger's arm. More particularly, it relates to an armrest assembly mounted on a console of a vehicle, which is operable to unlock an armrest from the console on the same plane as an upper end of the armrest.

Description of Related Art

An armrest supporting a passenger's arm is installed in a console separating a driver seat from a passenger seat in the middle of a first row seat of a vehicle.

In particular, a storage box capable of storing various objects is installed in the console, and the armrest serves as a cover of the storage box. In this case, the armrest is locked to the storage box as usual (when the storage box is used as the armrest), and, when the storage box is opened, the armrest is unlocked and then pivoted.

To describe a structure for locking or unlocking the armrest to the storage box, a knob for operation is installed at a front end of the armrest, and a locking hook which is operated due to the operation of the knob is installed.

Since the knob is installed below the front end of the armrest, a space for a passenger to operate the knob is required. Accordingly, the armrest has a shape which is mounted on the console, and thus the front end of the armrest is not naturally connected to the console so that it is difficult to implement a beautiful interior.

Further, since the knob is located below the front end of the armrest, in order to unlock the armrest, the passenger should bend his or her wrist excessively so that there is inconvenience in use.

SUMMARY

An embodiment of the present disclosure is directed to an armrest assembly mounted on a console of a vehicle, which is operable to unlock an armrest from the console on the same plane as an upper end of the armrest.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, there is provided an armrest assembly mounted on a console of a vehicle, which includes a console main body provided with a storage box in which a space is formed and installed between a driver seat and a passenger seat of a vehicle, an armrest pivotably installed in the storage box and configured to support an arm of a passenger riding in the vehicle and open and close an upper portion of the storage box, a button member installed in the console main body and configured to be operated by the passenger to unlock the armrest, an operating unit configured to lock or unlock the armrest from the console main body according to whether the button member is operated, and a console cover configured to cover a portion in which the button member and the operating unit are installed in the console main body and expose an upper end of the button member, wherein an upper end of the armrest, a surface of the console cover, and the upper end of the button member are disposed on the same surface from the armrest to the console cover.

A surface on which the upper end of the armrest, the surface of the console cover, and the upper end of the button member are disposed may be a curved surface.

The button member may be slidably installed in the console main body.

The armrest assembly may further include a button guide configured to guide sliding of the button member in the console main body.

The operating unit may include a locking hook pivotably installed in the console main body and configured to lock one side of the armrest and unlock the armrest when an operating force is transferred from the button member.

The locking hook may be elastically supported to be pivoted in a direction of locking the armrest.

A torsion spring configured to elastically support the locking hook may be installed at a rotation center of the locking hook.

The locking hook may be installed as one or more locking hooks at intervals in a width direction of the vehicle, and the armrest assembly may further include a hook connection rod configured to transfer the operating force of the button member to the one or more locking hooks.

The hook connection rod may be pivotably installed coaxially with the locking hook.

A pressing part may be formed on one side of the hook connection rod to be in contact with a lower end of the button member and to input the operating force of the button member to the hook connection rod.

The button member may include a button knob having an upper end exposed to the console cover and configured to be operated by the passenger, and a button rod formed to extend from the button knob in a sliding direction of the button member and configured to transfer the operating force input to the button knob to the operating unit.

A hook-catching part to which an end portion of the locking hook is caught and fixed may be formed in the armrest.

The locking hook and the armrest may be disposed in plural in the width direction of the vehicle, and each of the locking hooks may be dedicated to lock each of the armrests.

The armrests may be installed to be opened and closed to left and right sides in the width direction of the vehicle, and the locking hooks may be installed at both ends of the hook connection rod.

A bracket at which the locking hook is hinge-coupled to the hook connection rod may be formed on an outer side of the storage box.

A hinge pin may be installed to pass through the locking hook, the hook connection rod, and the bracket.

A stopper configured to restrict pivoting of the hook connection rod and the locking hook at a predetermined angle or more may be formed on an outer side of the hook connection rod.

A cover mounting bracket on which the console cover is mounted may be engaged with the bracket.

A button guide configured to guide the sliding of the button member may be mounted on the cover mounting bracket in the console main body.

Meanwhile, an armrest assembly mounted on a console of a vehicle includes a console main body provided with a storage box in which a space is formed and installed between a driver seat and a passenger seat of a vehicle, an armrest pivotably installed in the storage box and configured to support an arm of a passenger riding in the vehicle and open and close an upper portion of the storage box, a console cover configured to cover a part of an upper portion of the console main body, a button member slidably installed in the console main body and configured to be operated by the passenger to unlock the armrest, and a locking hook pivotably installed in the console main body and configured to lock one side of the armrest and unlock the armrest when an operating force is transferred from the button member, wherein the locking hook is installed as one or more locking hooks at intervals in a width direction of the vehicle, the armrest assembly further includes a hook connection rod pivotably installed coaxially with the locking hook and configured to transfer the operating force of the button member to the one or more locking hooks, and a pressing part may be formed on one side of the hook connection rod to be in contact with a lower end of the button member and to input the operating force of the button member to the hook connection rod.

DETAILED DESCRIPTION

Hereinafter, an armrest assembly mounted on a console of a vehicle according to the present disclosure will be described in detail with reference to the accompanying drawings.

Figure 1:
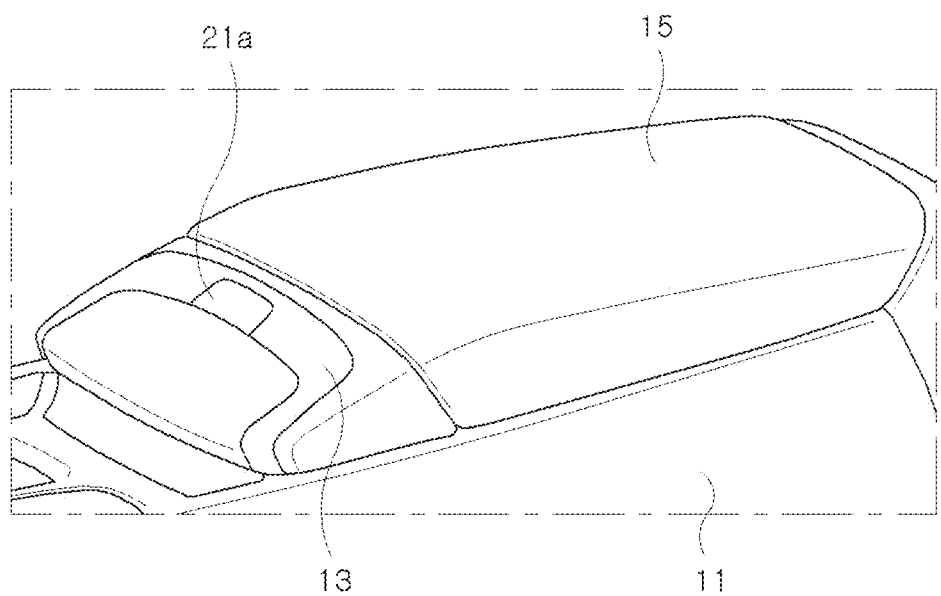
FIG. 1 is a perspective view illustrating a state in which an armrest assembly mounted on a console of a vehicle is locked according to the present disclosure.
Figure 2:
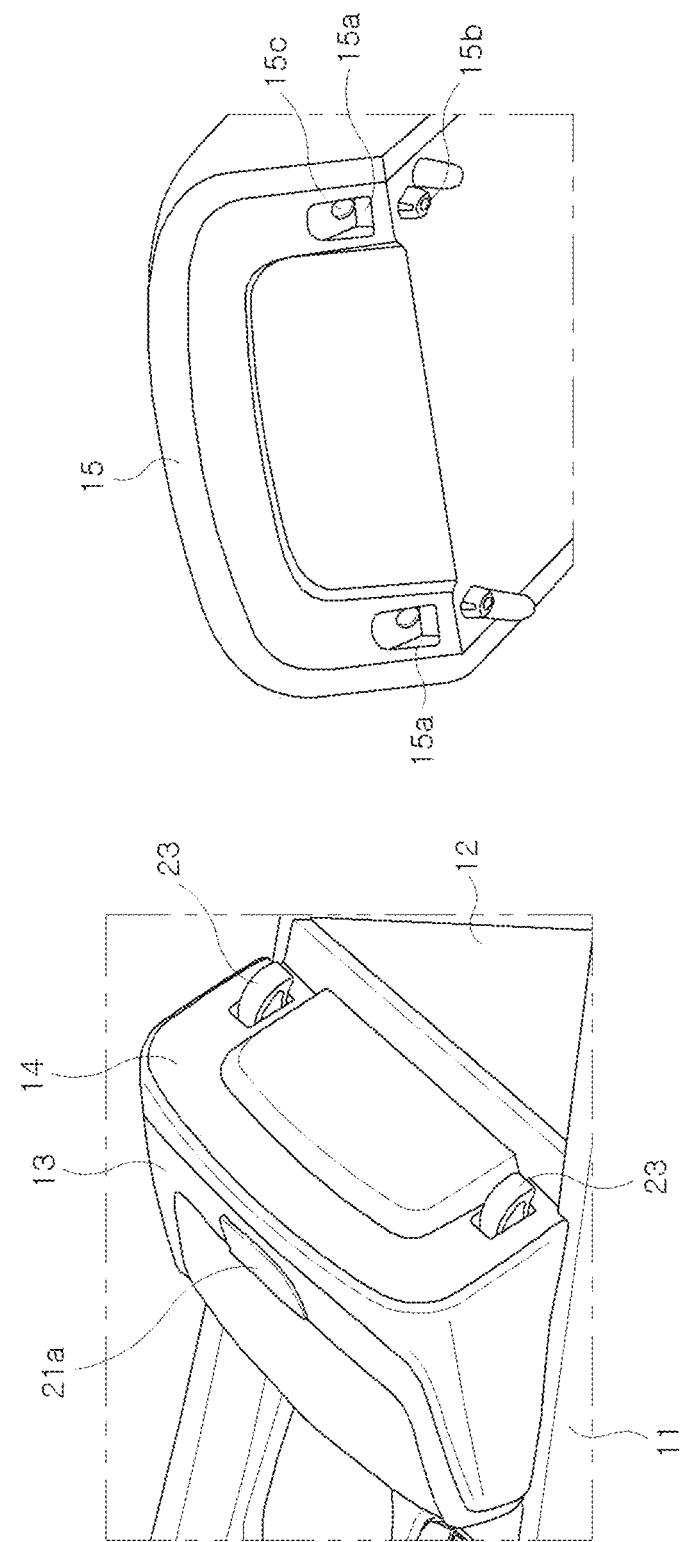
FIG. 2 is a perspective view illustrating a state in which the armrest assembly mounted on the console of the vehicle is unlocked and an armrest is partially pivoted according to the present disclosure.
Figure 3:
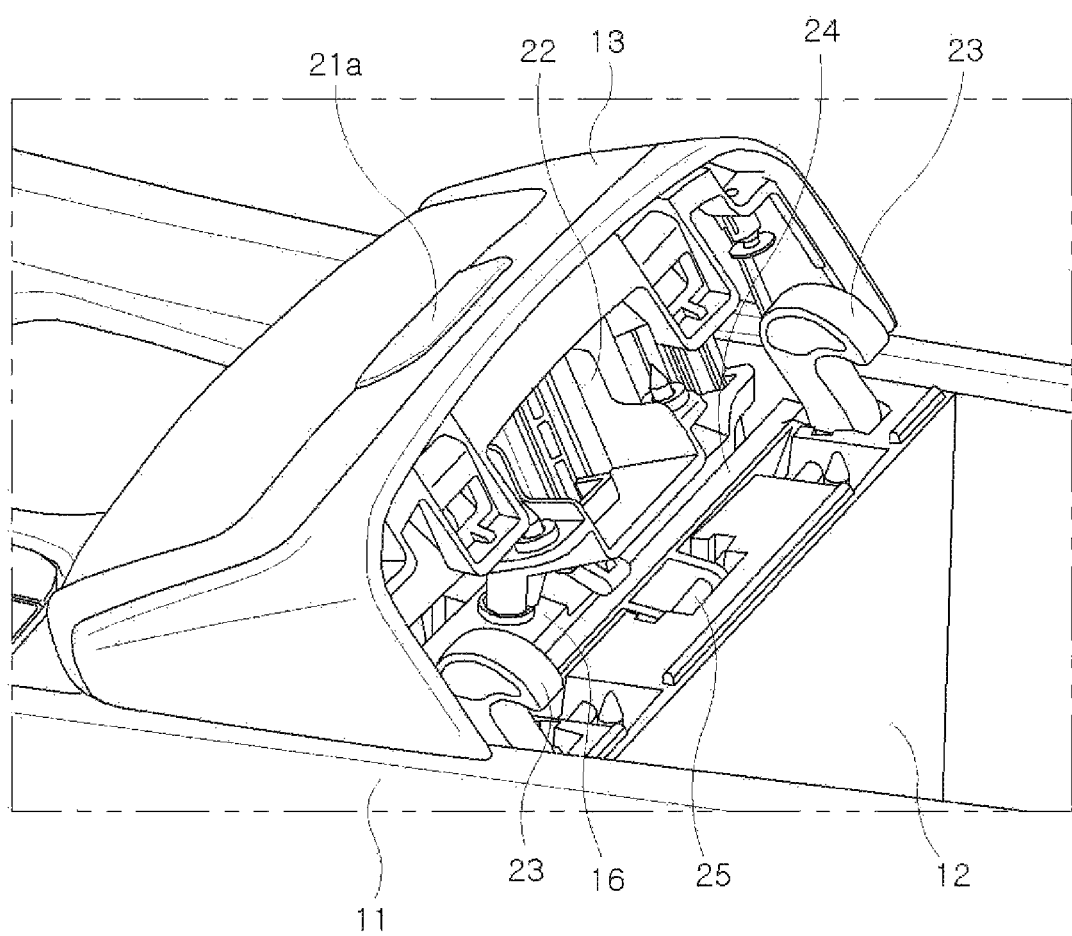
FIG. 3 is a perspective view illustrating a portion in which a button member is installed in the armrest assembly mounted on the console of the vehicle according to the present disclosure.

Referring to FIGS. 1 and 2, the armrest assembly mounted on a console of a vehicle according to the present disclosure includes a storage box 12 in which a space is formed, a console main body 11 installed between a driver seat and a passenger seat of the vehicle, an armrest 15 pivotably installed in the storage box 12 and configured to support the arm of a passenger riding in the vehicle and open and close an upper portion of the storage box 12, a button member 21 installed in the console main body 11 and configured to be operated to unlock the armrest 15 by the passenger, an operating unit configured to lock or unlock the armrest 15 to or from the console main body 11 according to whether the button member 21 is operated, and a console cover 13 configured to cover a portion in which the button member 21 and the operating unit are installed in the console main body 11 and expose an upper end of the button member 21. An upper end of the armrest 15, a surface of the console cover 13, and the upper end of the button member 21 are disposed on the same surface from the armrest 15 to the console cover 13.

The console main body 11 is installed between the driver seat and the passenger seat of the vehicle. The console main body 11 divides the driver seat and the passenger seat, and a gear knob, various operation buttons, and the like are installed in the console main body 11, or a storage space such as a cup holder is installed in the console main body 11.

The storage box 12, in which a space is formed to be capable of storing various objects therein, is installed in the console main body 11.

A rear cover 14 is preferably provided on one side of the console main body 11.

The armrest 15 is pivotably installed with respect to the upper portion of the storage box 12. The armrest 15 is formed of a cushion material. Accordingly, the armrest 15 serves to support the arm of the passenger, and serves as a cover for opening and closing the upper portion of the storage box 12. That is, since the armrest 15 is locked to one side of the console main body 11 as usual, the armrest 15 blocks the upper portion of the storage box 12 while supporting the arm of the passenger. When the armrest 15 is unlocked, the armrest 15 is pivoted with respect to the storage box 12 to open the upper portion of the storage box 12 so that an object is stored in or taken out of the storage box 12. A pop-up member 15b may be provided in the armrest 15 to absorb an impact generated between the armrest 15 and the storage box 12 when the armrest 15 blocks the storage box 12 and to pop up the armrest 15 when the armrest 15 is unlocked. Further, it is preferable to provide a buffer member 15c which is formed of an elastic material to absorb an impact generated during locking of a locking hook 23, which will be described below, and eliminates a gap between the locking hook 23 and the armrest 15.

Figure 4:
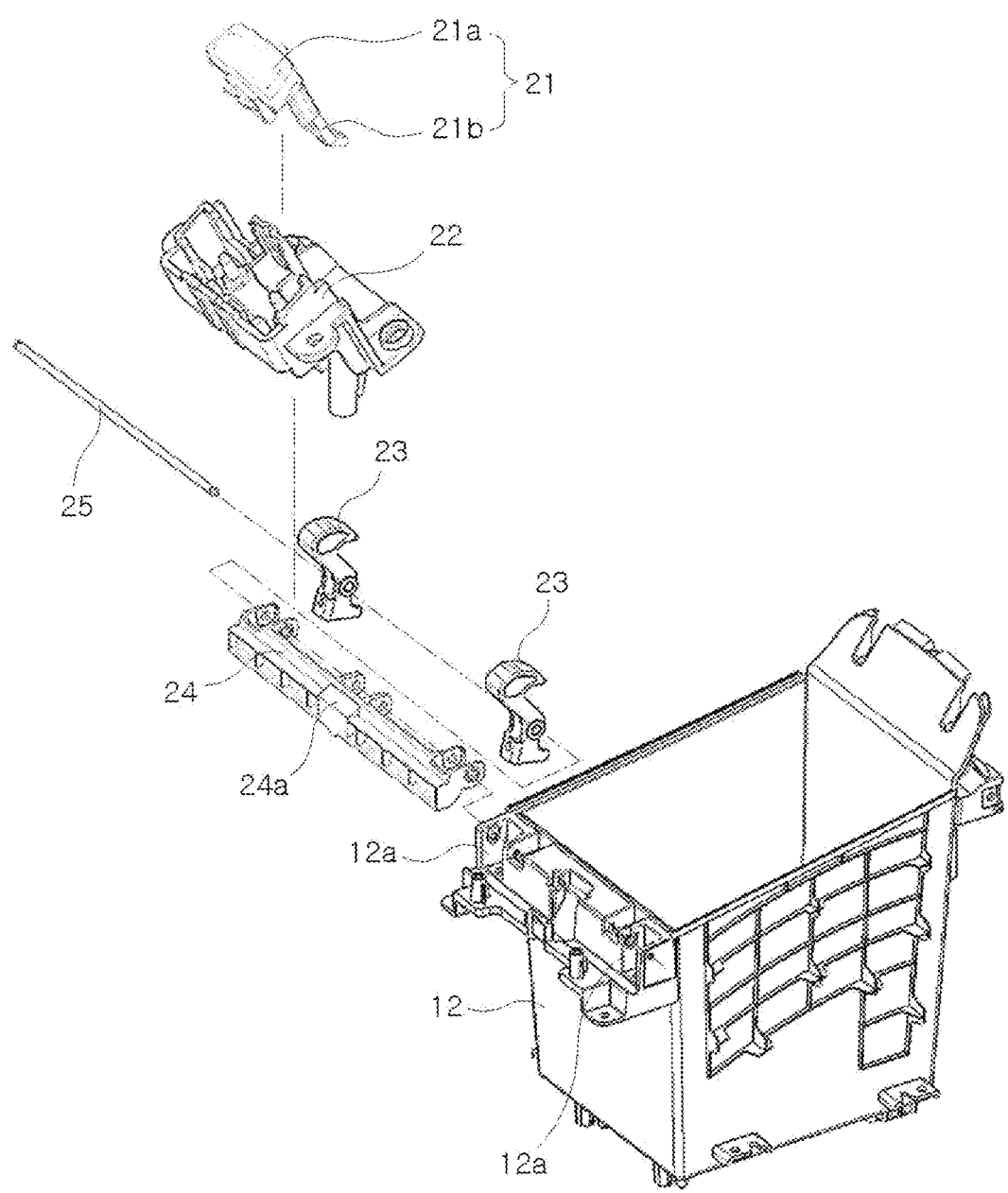
FIG. 4 is an exploded perspective view illustrating the portion in which the button member is installed in the armrest assembly mounted on the console of the vehicle according to the present disclosure.

The button member 21, shown in FIG. 4, is slidably installed in the console main body 11. Since the button member 21 can be vertically raised and lowered, the passenger pushes the button member 21 to operate. When the button member 21 is pressed by the passenger, the armrest 15 is unlocked.

The operating unit unlocks the armrest 15 from the console main body 11 due to an operating force input to the button member 21.

The console cover 13 is coupled to an upper portion of the console main body 11. The console cover 13 is coupled to the upper portion of the console main body 11 to cover the upper portion or a part of the upper portion of the console main body 11. Preferably, the console cover 13 covers a portion in which the button member 21 and the operating unit are installed in the console main body 11.

A through-hole is formed at one side of the console cover 13 so that the upper end of the button member 21 is exposed.

In the present disclosure, the upper end of the armrest 15, the surface of the console cover 13, and the upper end of the button member 21 are located on the same surface. It is preferable that the surface on which the upper end of the armrest 15, the surface of the console cover 13, and the upper end of the button member 21 are disposed is a curved surface. Since the upper end of the armrest 15, the surface of the console cover 13, and the upper end of the button member 21 are located on the same surface, a front end of the armrest 15 is naturally connected to the console cover 13 to create a beautiful interior.

The button member 21 includes a button knob 21a which is can be pushed by the passenger, and a button rod 21b which is formed to extend from the button knob 21a in a sliding direction of the button member 21 and transfers an operating force input to the button knob 21a. The button member 21 is installed in the console main body 11 to be slidable in an operating direction of the passenger.

Further, the button member 21 is elastically supported on a button return spring 21c or the like after the operation so as to return to an original position.

An upper end of the button knob 21a is exposed on the console cover 13. The upper end of the button knob 21a and the surface of the console cover 13 are formed on the same surface. The upper end of button knob 21a is formed with a predetermined area to allow the passenger to operate. The button return spring 21c is installed on one side of the button knob 21a.

The button rod 21b extends from a lower end of the button knob 21a in an operating direction of the button member 21. Since the button member 21 substantially slides in the vertical direction, the button rod 21b extends downward from the lower end of the button knob 21a. A lower end of the button rod 21b is in contact with one side of the operating unit or is located adjacent to the operating unit.

A button guide 22 is mounted in the console main body 11 to guide sliding of the button member 21. Since the button rod 21b passes through the button guide 22, the button guide 22 guides sliding of the button rod 21b. In a state in which the button guide 22 is installed in a cover mounting bracket 16 formed and mounted on a bracket 12a of the storage box 12, the button guide 22 is mounted on the button member 21 so that the button member 21 is installed in a slidable state in the console main body 11.

The operating unit includes the locking hook 23 pivotably installed in the console main body 11 and configured to lock one side of the armrest 15 as usual and unlock the armrest 15 when the button member 21 is operated.

The locking hook 23 is pivotably installed in the console main body 11, preferably, in the bracket 12a formed on one side of the storage box 12.

An intermediate portion of the locking hook 23 is pivotable with respect to the bracket 12a, and an upper end thereof is formed to restrict one side of the armrest 15. Further, the locking hook 23 is elastically supported so as to be pivoted in a direction of restricting the armrest 15. Thus, when the operating force is not input, the locking hook 23 is pivoted in the direction of restricting the armrest 15 (in a clockwise direction in FIG. 5).

Meanwhile, a hook-catching part 15a, which is locked due to the locking hook 23, is formed in the armrest 15. Since the hook-catching part 15a is formed in a shape which is caught to an upper end of the locking hook 23 while accommodating the upper end thereof, when the upper end of the locking hook 23 is accommodated in the hook-catching part 15a, the armrest 15 is locked, and, when the locking hook 23 is released from the hook-catching part 15a, the armrest 15 is unlocked.

Further, it is preferable that the operating unit includes a hook connection rod 24 for transferring the operating force of the button member 21 to the locking hook 23.

The hook connection rod 24 receives the operating force of the button member 21 and transfers the input operating force to the locking hook 23 so that a plurality of locking hooks 23 may be operated using a single button member 21.

The hook connection rod 24 is hinge-coupled to the bracket 12a formed in the storage box 12, and, when the button member 21 is operated, the hook connection rod 24 is pivoted.

A pressing part 24a is formed in the hook connection rod 24 to be in contact with the lower end of the button rod 21b, and thus the operating force is input to the hook connection rod 24 from the button rod 21b through the pressing part 24a.

Figure 9:
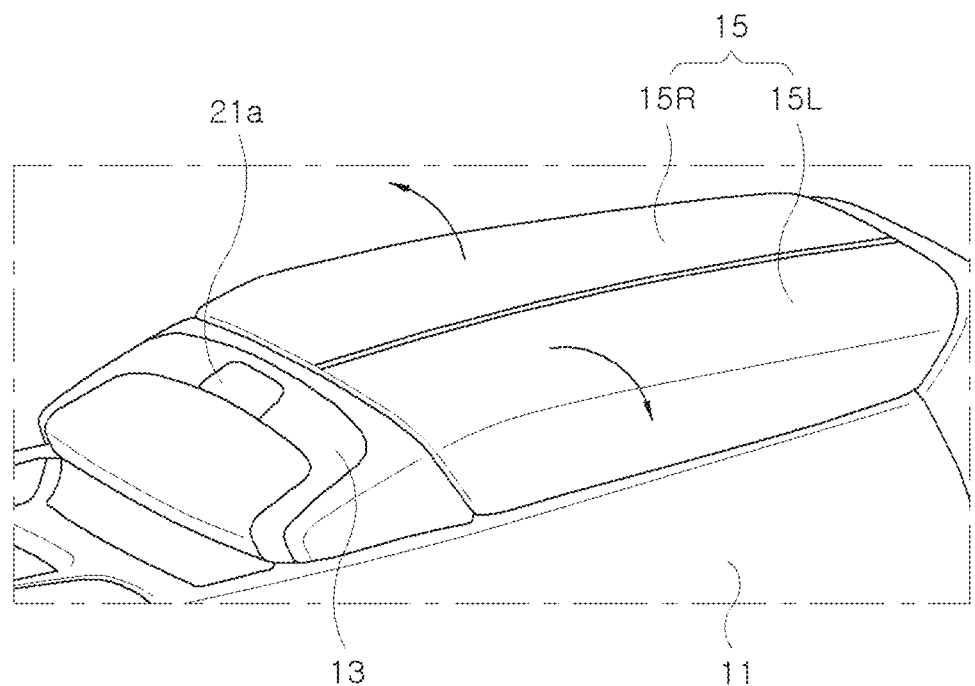
FIG. 9 is a perspective view of an alternate embodiment of the armrest assembly according to the present disclosure.

The hook connection rod 24 allows the plurality of locking hooks 23 spaced apart from each other to be simultaneously pivoted when the button member 21 is operated. To this end, the locking hooks 23 are disposed at intervals in a width direction of the vehicle and are connected to each other through the hook connection rod 24 so that the plurality of the locking hooks 23 are operated simultaneously. Thus, when a plurality of the armrests 15 are disposed in the width direction of the vehicle, the locking hooks 23 may be dedicated to the armrests 15. For example, when the armrest 15 is divided into two portions 15L and 15R, as shown in FIG. 9, and disposed in the width direction of the vehicle and the two portions of the armrest 15 are configured to be openable and closable to left and right sides of the vehicle, the locking hooks 23 installed at both ends of the hook connection rod 24 are dedicated to lock the two portions of the armrest 15.

The locking hook 23 is coupled to the hook connection rod 24 using a coupling pin 23a so that the hook connection rod 24 and the locking hook 23 are integrally pivoted.

Figure 5:
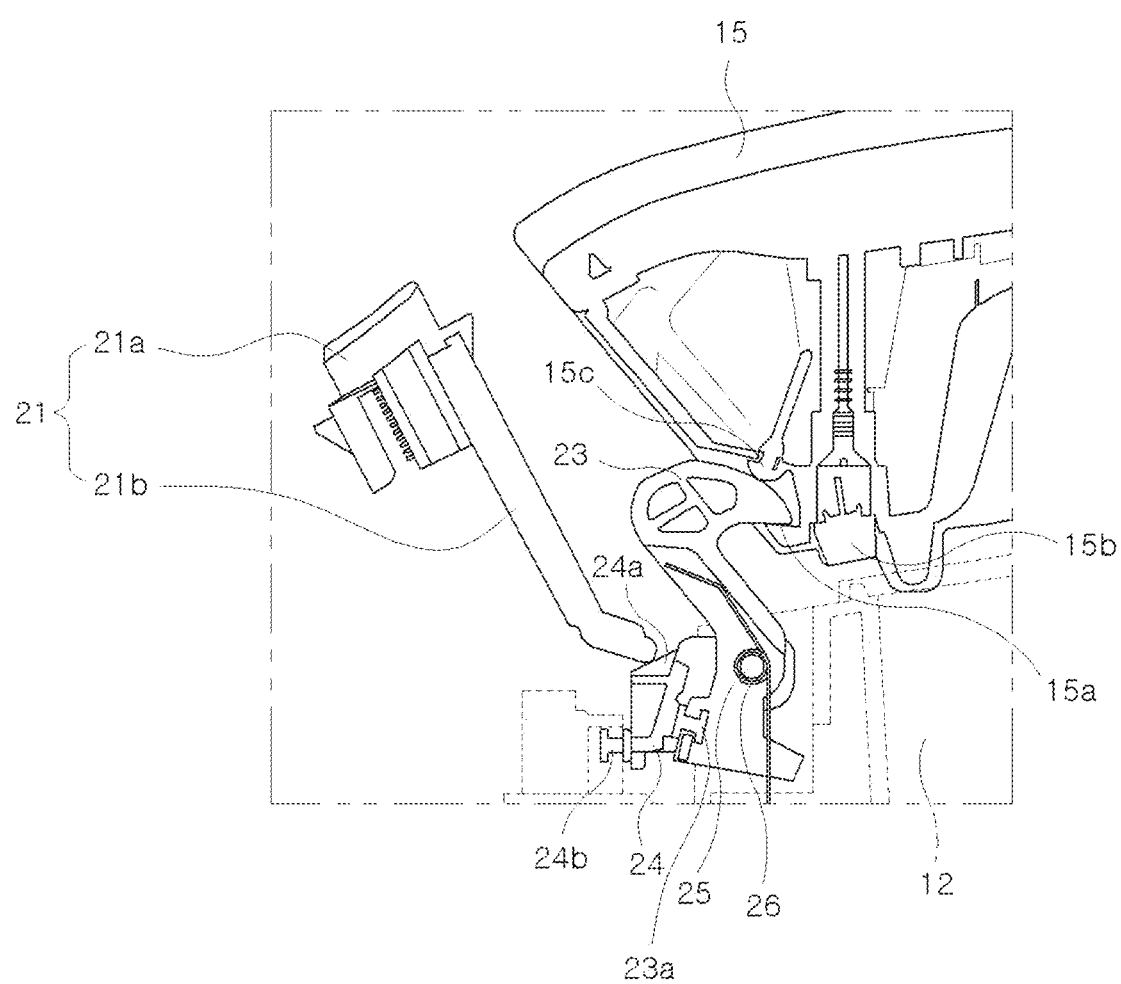
FIG. 5 is a cross-sectional view illustrating the state in which the armrest assembly mounted on the console of the vehicle is locked according to the present disclosure.

A stopper 24b is formed on an outer side of the hook connection rod 24 to limit pivoting of the hook connection rod 24 and the locking hook 23 at a predetermined angle or more. The stopper 24b is caught to one side of the console main body 11 so that the hook connection rod 24 and the locking hook 23 are restricted from being pivoted at the predetermined angle or more. In a state in which the armrest 15 is unlocked and then opened, when the operating force pressing the button member 21 is removed, the locking hook 23 is excessively pivoted (in the clockwise direction in FIG. 5), and, when the armrest 15 is closed, the button member 21 is pressed by a lower portion of the armrest 15 so that the locking hook 23 may not lock the armrest 15. Therefore, even in a state in which the armrest 15 is pivoted, the stopper 24b limits the pivoting of the hook connection rod 24 so as to allow the locking hook 23 to maintain a position as shown in FIG. 5 so that pivoting of the locking hook 23 is also limited.

A hinge pin 25 is installed to pass through the bracket 12a formed in the storage box 12, the locking hook 23, and the hook connection rod 24, and thus the locking hook 23 and the hook connection rod 24 may be pivoted around the hinge pin 25.

The cover mounting bracket 16 on which the console cover 13 is mounted is engaged with the bracket 12a. One side of the console cover 13 is mounted on the cover mounting bracket 16, and thus the console cover 13 is mounted on the console main body 11.

The button guide 22 may be mounted on the cover mounting bracket 16.

An operation of the armrest assembly mounted on a console of a vehicle, which has the above configuration, according to the present disclosure will be described as follows.

FIG. 5 illustrates a state in which the armrest 15 is locked. In a state in which the locking hook 23 locks the armrest 15, the armrest 15 may support the arm of the passenger. Further, the armrest 15 blocks the upper portion of the storage box 12.

Thereafter, when the passenger desires to open the upper portion of the storage box 12, the passenger presses the button knob 21a to unlock the armrest 15.

When the passenger pushes the button knob 21a located at a front side of the armrest 15 and located on the same surface as the upper end the armrest 15 in a state in which the arm of the passenger rests on the armrest 15, the armrest 15 is unlocked. Since the button knob 21a is located on the same surface as the upper end of the armrest 15 at the front side of the armrest 15, the passenger easily operates the button knob 21a by hands.

Figure 6:
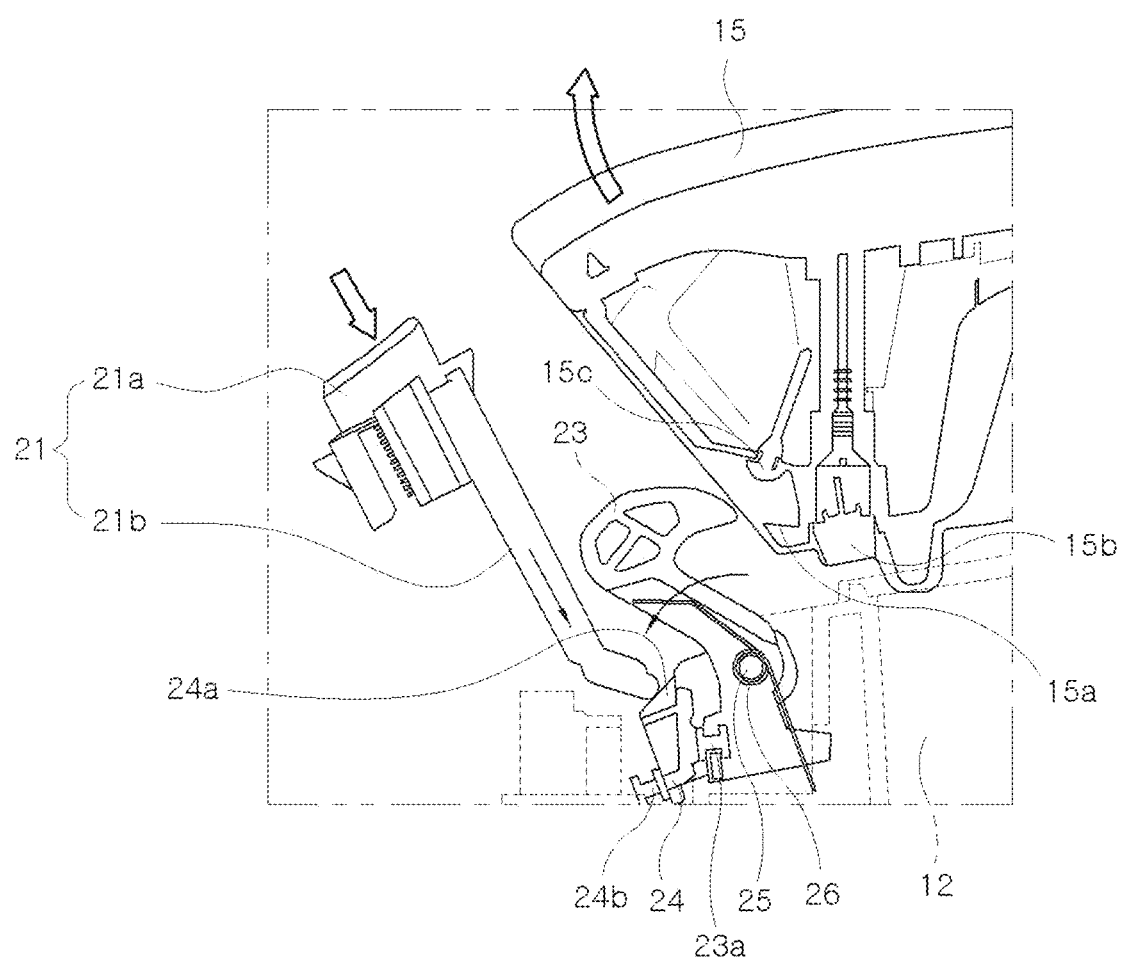
FIG. 6 is a cross-sectional view illustrating the state in which the armrest assembly mounted on the console of the vehicle is operated according to the present disclosure.
Figure 7:
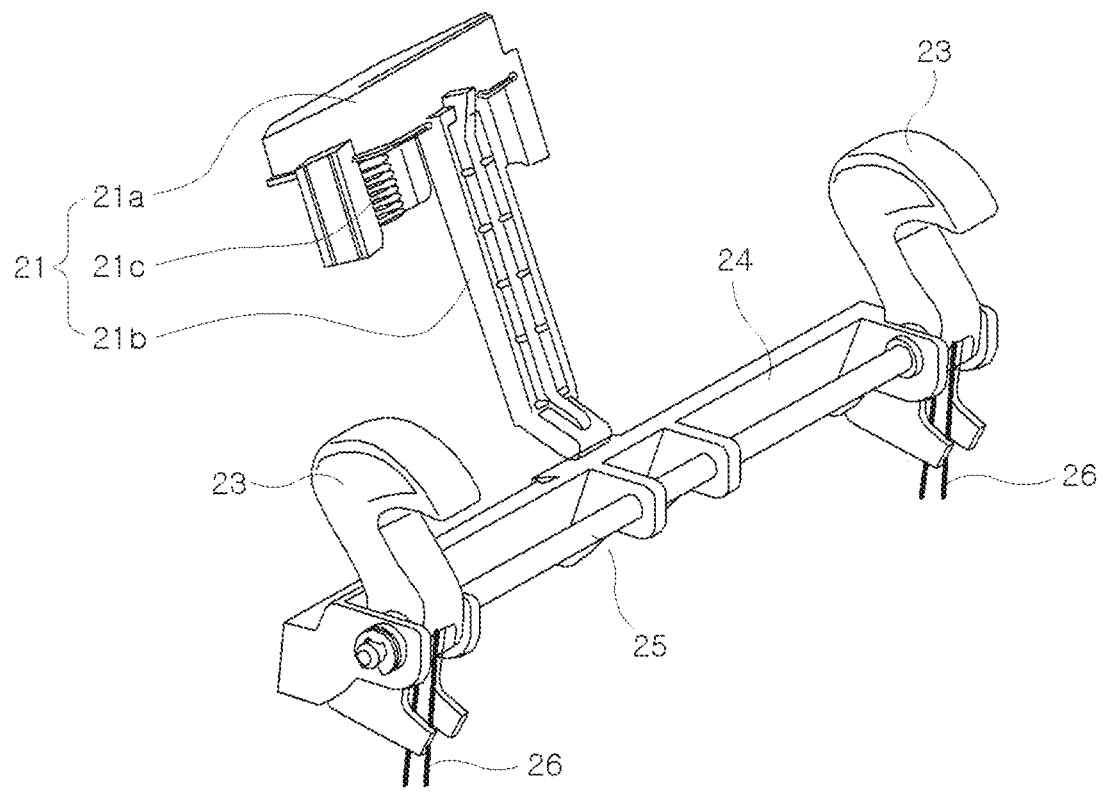
FIGS. 7 and 8 are perspective views illustrating the button member and a locking hook in the armrest assembly mounted on the console of the vehicle according to the present disclosure.
Figure 8:
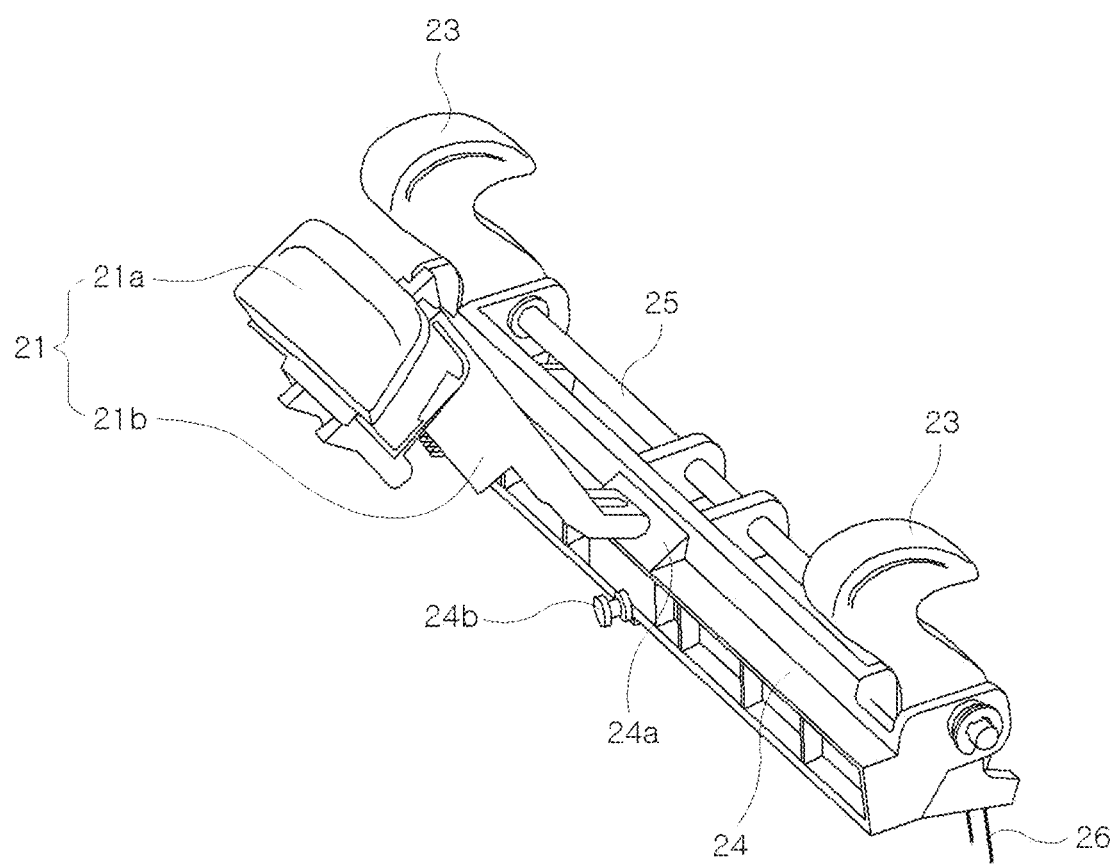

As shown in FIG. 6, when the button knob 21a is pressed, the button member 21 is lowered in a state of being guided by the button guide 22.

When the button member 21 is lowered, the lower end of the button rod 21b presses the pressing part 24a.

When the pressing part 24a is pressed, the hook connection rod 24 and the locking hook 23 are pivoted. As the locking hook 23 is pivoted, the upper end of the locking hook 23 is separated from the hook-catching part 15a of the armrest 15 so that the armrest 15 becomes a pivotable state.

When the armrest 15 is unlocked, the armrest 15 pops up, and the passenger pivots the unlocked armrest 15 to open the upper portion of the storage box 12. When the upper portion of the storage box 12 is opened, an object may be inserted into the storage box 12 or an object stored in the storage box 12 may be taken out.

In the present disclosure, the hook connection rod 24 may be omitted, and the button member 21 may be configured to directly operate the locking hook 23. That is, in a state in which one side of the storage box 12 is pivotably installed and the lower end of the button rod 21b is installed to be in contact with the one side of the locking hook 23, when the passenger presses the button member 21, the operating force is transferred to the locking hook 23 so that the locking hook 23 may be pivoted.

In this case, when the locking hook 23 is located at an intermediate position in the width direction of the vehicle and the armrest is opened to both sides, a single locking hook may simultaneously lock or unlock two armrests.

In accordance with an armrest assembly mounted on a console of a vehicle, which has the above configuration, according to the present disclosure, a button member for unlocking an armrest is operated on the same surface as an upper end of the armrest so that, when the armrest is unlocked, inconvenience in which a wrist should be bent can be solved and an operation becomes easy.

Further, the upper end of the armrest and a console cover are formed in a continuous surface so that an interior of the vehicle is beautiful.

While the present disclosure has been described with respect to the specific embodiments, it will be apparent to those skilled in the art that various changes and modifications may be made without departing from the spirit and scope of the present disclosure as defined in the following claims. Accordingly, it should be noted that such alternations or modifications fall within the claims of the present disclosure, and the scope of the present disclosure should be construed on the basis of the appended claims.

The invention claimed is:

1. An armrest assembly mounted on a console of a vehicle, comprising:
    a console main body provided with a storage box in which a space is formed, the console main body being installed between a driver seat and a passenger seat of a vehicle;
    an armrest pivotably connected to the storage box, the armrest being configured to support an arm of a passenger riding in the vehicle, and the armrest further being configured to open and close an upper portion of the storage box;
    a button member connected to the console main body and configured to be operated by the passenger to unlock the armrest;
    an operating unit configured to lock or unlock the armrest from the console main body when button member is operated; and
    a console cover configured to cover a portion in which the button member and the operating unit are installed in the console main body, the console cover further configured to expose an upper end of the button member;
    wherein an upper end of the armrest, a surface of the console cover, and the upper end of the button member are disposed on the same surface from the armrest to the console cover;
    wherein the button member is slidably connected to the console main body;
    wherein the operating unit includes a locking hook pivotably installed in the console main body and configured to lock one side of the armrest, and unlock the armrest when an operating force is transferred from the button member; and
    wherein:
    the locking hook is installed as one or more locking hooks at intervals in a width direction of the vehicle; and
    the armrest assembly further includes a hook connection rod configured to transfer the operating force of the button member to the one or more locking hooks.

2. The armrest assembly of claim 1, wherein the same surface on which the upper end of the armrest, the surface of the console cover, and the upper end of the button member are disposed is a curved surface.

3. The armrest assembly of claim 1, further comprising:
    a button guide configured to guide sliding of the button member in the console main body.

4. The armrest assembly of claim 1, wherein the locking hook is elastically supported to be pivoted in a direction of locking the armrest.

5. The armrest assembly of claim 4, wherein the locking hook comprises a torsion spring configured to elastically support at a rotation center of the locking hook.

6. The armrest assembly of claim 1, wherein the hook connection rod is pivotably installed coaxially with the locking hook.

7. The armrest assembly of claim 1, wherein a pressing part is formed on one side of the hook connection rod to be in contact with a lower end of the button member, and to input the operating force of the button member to the hook connection rod.

8. The armrest assembly of claim 1, wherein the button member includes:
- a button knob having an upper end exposed to the console cover and configured to be operated by the passenger; and
- a button rod formed to extend from the button knob in a sliding direction of the button member and configured to transfer the operating force input to the button knob to the operating unit.

9. The armrest assembly of claim 1, wherein a hook-catching part to which an end portion of the locking hook is caught and fixed is formed in the armrest.

10. The armrest assembly of claim 1, further comprising two locking hooks, and wherein the armrest is formed as two portions in the width direction of the vehicle; and
- wherein each of the locking hooks is dedicated to lock each portion of the armrest.

11. The armrest assembly of claim 10, wherein:
- each portion of the armrest is configured to be opened and closed to left and right sides in the width direction of the vehicle; and
- the two locking hooks are installed at both ends of the hook connection rod.

12. The armrest assembly of claim 1, wherein a bracket on which the locking hook is hinge-coupled to the hook connection rod is formed on an outer side of the storage box.

13. The armrest assembly of claim 12, wherein a hinge pin is installed to pass through the locking hook, the hook connection rod, and the bracket.

14. The armrest assembly of claim 1, wherein a stopper configured to restrict pivoting of the hook connection rod and the locking hook at a predetermined angle or more is formed on an outer side of the hook connection rod.

15. The armrest assembly of claim 12, wherein a cover mounting bracket on which the console cover is mounted is engaged with the bracket.

16. The armrest assembly of claim 15, wherein a button guide configured to guide the sliding of the button member is mounted on the cover mounting bracket in the console main body.

17. An armrest assembly mounted on a console of a vehicle, comprising:
- a console main body provided with a storage box in which a space is formed, the console main body being installed between a driver seat and a passenger seat of a vehicle;
- an armrest pivotably connected to the storage box, the armrest being configured to support an arm of a passenger riding in the vehicle, and the armrest being configured to open and close an upper portion of the storage box;
- a console cover configured to cover a part of an upper portion of the console main body;
- a button member slidably connected to the console main body, and configured to be operated by the passenger to unlock the armrest; and
- a locking hook pivotably installed in the console main body and configured to lock one side of the armrest and unlock the armrest when an operating force is transferred from the button member,
- wherein the locking hook is installed as one or more locking hooks at intervals in a width direction of the vehicle;
- the armrest assembly further including a hook connection rod pivotably installed coaxially with the locking hook and configured to transfer the operating force of the button member to the one or more locking hooks; and
- a pressing part formed on one side of the hook connection rod to be in contact with a lower end of the button member and to input the operating force of the button member to the hook connection rod.

* * * * *